(12) United States Patent
Jeon et al.

(10) Patent No.: US 9,272,710 B2
(45) Date of Patent: Mar. 1, 2016

(54) APPARATUS AND METHOD FOR PREVENTING VEHICLE COLLISION

(71) Applicant: Hyundai Motor Company, Seoul (KR)

(72) Inventors: Dae Seok Jeon, Gyeonggi-do (KR); Suk Ki Min, Gyeonggi-do (KR); Dong Hyun Sung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/313,316

(22) Filed: Jun. 24, 2014

(65) Prior Publication Data
US 2015/0232090 A1    Aug. 20, 2015

(30) Foreign Application Priority Data
Feb. 14, 2014    (KR) .......................... 10-2014-0017326

(51) Int. Cl.
| | |
|---|---|
| B60T 7/22 | (2006.01) |
| G06F 19/00 | (2011.01) |
| G08G 1/16 | (2006.01) |
| B60W 30/09 | (2012.01) |
| B60T 7/12 | (2006.01) |
| B60W 10/18 | (2012.01) |

(Continued)

(52) U.S. Cl.
CPC *B60W 30/09* (2013.01); *B60T 7/12* (2013.01); *B60W 10/18* (2013.01); *B60W 10/20* (2013.01); *B60W 30/095* (2013.01)

(58) Field of Classification Search
CPC ... B60W 30/09; B60W 30/095; B60W 10/18; B60W 10/20; B60W 2550/10; B60W 2550/20; B60T 7/12; B60T 2201/083; B60T 2201/087; G08G 1/16; G08G 1/166; B60Q 1/44; B60R 21/0134; B60G 2400/823; B60G 2800/92; B62D 15/0265; B62D 6/00
USPC .................. 701/1, 41, 70, 301; 340/435, 436; 180/271
See application file for complete search history.

(56) References Cited

U.S. PATENT DOCUMENTS

2011/0015818 A1* 1/2011 Breuer ................ B60T 8/17558
701/31.4
2013/0166150 A1* 6/2013 Han ...................... B60W 10/18
701/42

(Continued)

FOREIGN PATENT DOCUMENTS

| JP | 4451209 B2 | 4/2010 |
|---|---|---|
| JP | 2010162927 A | 7/2010 |

(Continued)

*Primary Examiner* — Adam Tissot
(74) *Attorney, Agent, or Firm* — Mintz Levin Cohn Ferris Glovsky and Popeo, P.C.; Peter F. Corless

(57) ABSTRACT

An apparatus and a method for preventing a vehicle collision are provided. The method includes collecting, by a controller, vehicle information of a traveling vehicle and calculating a last point to brake time to collision, a last point to steer time to collision, a front collision warning time to collision, and time to collision based on the collected vehicle information. The controller confirms whether the traveling vehicle enters a collision risk area in which there is a collision possibility between the traveling vehicle and a front vehicle. A vehicle driving support is controlled based on a direction in which a rear-side vehicle is present and whether steering is attempted when the traveling vehicle enters the collision risk area, thereby minimizing the collision between the traveling vehicle and the front vehicle and rear-side vehicle.

20 Claims, 13 Drawing Sheets

(51) Int. Cl.
*B60W 10/20* (2006.01)
*B60W 30/095* (2012.01)

(56) References Cited

U.S. PATENT DOCUMENTS

2013/0338878 A1* 12/2013 Fritz .................... B60W 10/18
701/41
2014/0195120 A1* 7/2014 McClain ................ G08G 1/16
701/41
2014/0350813 A1 11/2014 Jeon et al.

FOREIGN PATENT DOCUMENTS

| KR | 10-0110780 | 10/1996 |
| KR | 10-2009-0063311 | 6/2009 |
| KR | 10-2010-0004565 A | 1/2010 |
| KR | 10-2013-0074194 | 7/2013 |
| KR | 10-2014-0136666 | 12/2014 |

* cited by examiner

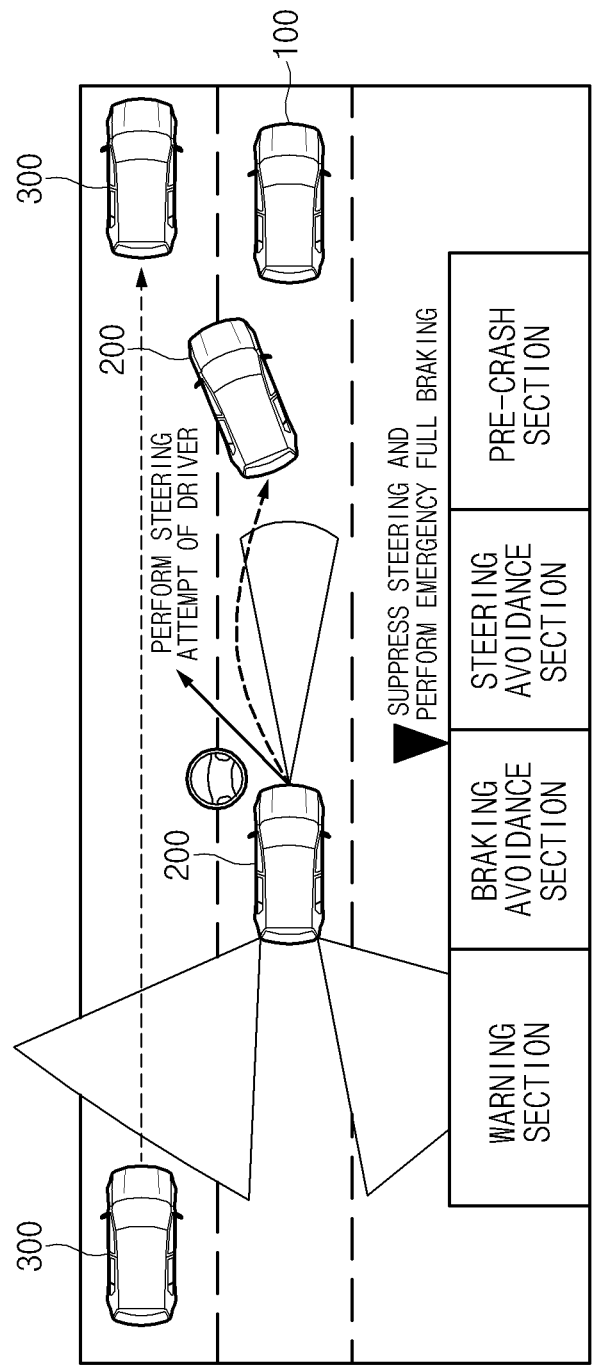

APPARATUS AND METHOD FOR PREVENTING VEHICLE COLLISION

CROSS-REFERENCE TO RELATED APPLICATION

This application is based on and claims priority from Korean Patent Application No. 10-2014-0017326, filed on Feb. 14, 2014 in the Korean Intellectual Property Office, the disclosure of which is incorporated herein in its entirety by reference.

BACKGROUND

1. Field of the Invention

The present invention relates to an apparatus and a method for preventing a vehicle collision, and more particularly, to an apparatus and a method for preventing a vehicle collision that operate the driving of a vehicle based on where a rear-side vehicle is present when the traveling vehicle enters a collision risk area with a front vehicle.

2. Description of the Prior Art

In general, an apparatus for preventing a vehicle collision calculates a steering avoidance section based on a relative speed to a front vehicle (e.g., a preceding vehicle), lateral acceleration, a quantity overlapping with a front vehicle, a coefficient of friction, acceleration of gravity, and the like and then outputs an alarm or notifies a driver when a traveling vehicle (e.g., the vehicle being driven) enters a steering avoidance section to allow a driver to change a lane. In particular, the quantity overlapping with the front vehicle is a quantity covering the front vehicle based on a width of the traveling vehicle. In other words, when the front vehicle and the traveling vehicle are disposed on a substantially straight line in a driving direction, the front vehicle and the traveling vehicle overlap each other.

The apparatus for preventing a vehicle collision according to the related art issues a warning when the traveling vehicle enters the collision risk area of the front vehicle. Accordingly, when a driver attempts collision avoidance by steering, the apparatus for preventing a vehicle collision leads to collision avoidance using a lateral control. However, the collision with the rear-side vehicle may occur while the driver changes a lane by the steering operation when a collision possibility is present between the traveling vehicle and the front vehicle.

SUMMARY

Accordingly, the present invention provides an apparatus and a method for preventing a vehicle collision that may minimize a front and rear-side collision by operating the driving of a vehicle based on when a rear-side vehicle (e.g., a vehicle traveling behind the traveling vehicle) is present and whether a driver attempts steering when a traveling vehicle enters a collision risk area with a front vehicle (e.g., a preceding vehicle).

In one aspect of the present invention, a method for preventing a vehicle collision may include: collecting vehicle information of a traveling vehicle; calculating a last point to brake time to collision, a last point to steer time to collision, a front collision warning time to collision, and time to collision based on the collected vehicle information; confirming whether the traveling vehicle enters a collision risk area in which a collision possibility is present between the traveling vehicle and a front vehicle; and executing a vehicle driving support based on a direction in which a rear-side vehicle is present and whether a driver attempts steering when the traveling vehicle enters the collision risk area.

In the confirmation of whether the traveling vehicle enters the collision risk area, whether the traveling vehicle enters a collision avoidance section may be determined by confirming whether the time to collision is less than the front collision warning time to collision. In addition, the execution of the vehicle driving support may include: outputting a front collision warning when the traveling vehicle enters the collision avoidance section; outputting the front collision warning and confirming whether the last point to steer time to collision is less than the last point to brake time to collision; confirming whether the traveling vehicle is out of a braking avoidance section (e.g., beyond the section range) when the last point to steer time to collision is less than the last point to brake time to collision; performing a steering support to perform the steering avoidance when the traveling vehicle is beyond the braking avoidance section; confirming whether the traveling vehicle is beyond a steering avoidance section; and performing full braking when the traveling vehicle is beyond the steering avoidance section.

The execution of the vehicle driving support may include: suppressing the steering of the traveling vehicle and performing the full braking when the rear-side vehicles are present at both sides of the traveling vehicle when the traveling vehicle enters the collision avoidance section; outputting the front collision warning and confirming whether the last point to steer time to collision is less than the last point to brake time to collision; confirming whether the traveling vehicle is beyond a braking avoidance section when the last point to steer time to collision is less than the last point to brake time to collision; suppressing the steering and executing the full braking when the traveling vehicle is beyond the braking avoidance section; confirming whether the traveling vehicle is beyond a steering avoidance section; and performing full braking when the traveling vehicle is beyond the steering avoidance section.

Further, the execution of the vehicle driving support may include: confirming whether a primary steering attempt is performed when the traveling vehicle enters the collision avoidance section; confirming whether the rear-side vehicle is present in a primary steering direction when the primary steering attempt is performed, suppressing the primary steering and performing the full braking when the rear-side vehicle is present in the primary steering direction; confirming whether the last point to steer time to collision is less than the last point to brake time to collision; confirming whether the traveling vehicle is beyond the braking avoidance section when the last point to steer time to collision is less than the last point to brake time to collision; confirming whether a secondary steering attempt is performed when the traveling vehicle is beyond the braking avoidance section; confirming whether the rear-side vehicle is present in the secondary steering direction when the secondary steering attempt is performed; and suppressing the secondary steering and performing the full braking when the rear-side vehicle is present in the secondary steering direction.

The method for preventing a vehicle collision may further include: maintaining a front collision warning output in response to confirming that the primary steering attempt is not performed in the confirmation of whether the primary steering attempt is performed. In addition, the method for preventing a vehicle collision may further include: performing the steering support to perform the steering avoidance in response to confirming that the secondary steering attempt is performed but the rear-side vehicle is not present in the secondary steering direction in the confirmation of whether the secondary steering attempt is performed. In the performing of the steering support, a motor driven power steering (MDPS) assist and a lateral assist by a partial braking of an electronic stability control (ESC) may be provided. The method for preventing a vehicle collision may also further include: confirming whether the traveling vehicle is beyond the braking avoidance section when the last point to steer time to collision is greater than the last point to brake time to collision, as the comparison result; and performing the full braking when the traveling vehicle is beyond the braking avoidance section.

In another aspect of the present invention, an apparatus for preventing a vehicle collision may include: a sensor unit configured to measure vehicle information using various sensors; an information collector configured to collect the vehicle information through the sensor unit; a last point to brake calculator configured to calculate a last point to brake distance to collision, a last point to brake time to collision, and a front collision warning time to collision based on the vehicle information; a last point to steer calculator configured to calculate a last point to steer distance to collision and a last point to steer time to collision based on the vehicle information; a collision time calculator configured to calculate time to collision between a traveling vehicle and a front vehicle based on the vehicle information; a controller configured to sense whether the traveling vehicle enters a collision risk area based on the time to collision, the last point to brake time to collision, the last point to steer time to collision, the front collision warning time to collision and execute a vehicle driving support based on a direction in which a rear-side vehicle is present and a steering operation of a driver within the collision risk area; and a driving supporter configured to support a vehicle driving based on the operation of the controller. In addition, each calculator and the sensor unit are executed by the controller.

In particular, the controller may be configured to execute a steering support based on the steering operation of the driver when the rear-side vehicle is not present, the last point to steer time to collision is less than the last point to brake time to collision, and a braking avoidance is not performed when the traveling vehicle enters in a collision avoidance section within the collision risk area. The controller may be configured to suppress steering and execute full braking when the traveling vehicle enters in the collision avoidance section when the rear-side vehicles are present at both sides of the traveling vehicle and suppress the steering and execute the full braking when the last point to steer time to collision is less than the last point to brake time to collision and the traveling vehicle is beyond a braking avoidance section.

The controller may also be configured to confirm whether a primary steering attempt by the driver is performed when the traveling vehicle enters the collision avoidance section and suppress steering and execute the full braking when the rear-side vehicle is present in a primary steering direction. The controller may be configured to confirm whether the rear-side vehicle is present in a secondary steering direction when the driver performs a secondary steering attempt when the last point to steer time to collision is less than the last point to brake time to collision and the braking avoidance is not performed to suppress the steering and execute the full braking when the rear-side vehicle is present. The controller may be configured to execute the steering avoidance when the secondary steering attempt is performed in a direction in which the rear-side vehicle is not present. The controller may be configured to execute the full braking when the last point to steer time to collision is equal to or greater than the last point to brake time to collision and the braking avoidance is not performed. The driving supporter may be configured to perform a motor driven power steering (MDPS) assist and a lateral assist by a partial braking of an electronic stability control (ESC). The driving supporter may also be configured to perform the full braking using an electronic stability control (ESC).

BRIEF DESCRIPTION OF THE DRAWINGS

The above and other objects, features and advantages of the present invention will be more apparent from the following detailed description taken in conjunction with the accompanying drawings, in which:

FIGS. 10 to 12 are exemplary diagrams illustrating a collision avoidance method with the front vehicle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
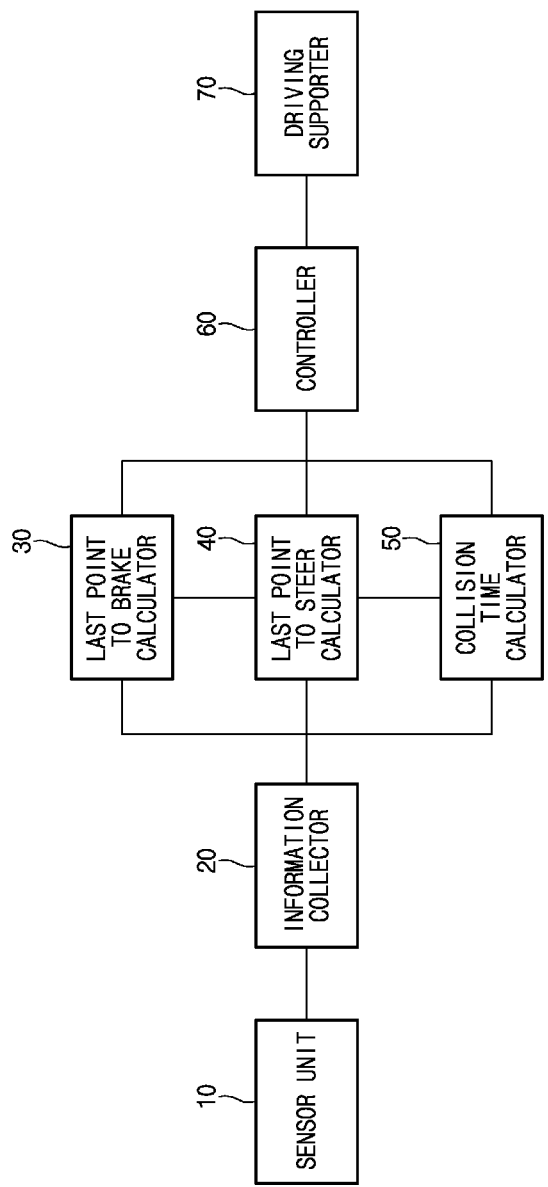
FIG. 1 is an exemplary block configuration diagram of an apparatus for preventing a vehicle collision according to an exemplary embodiment of the present invention.
Figure 2:
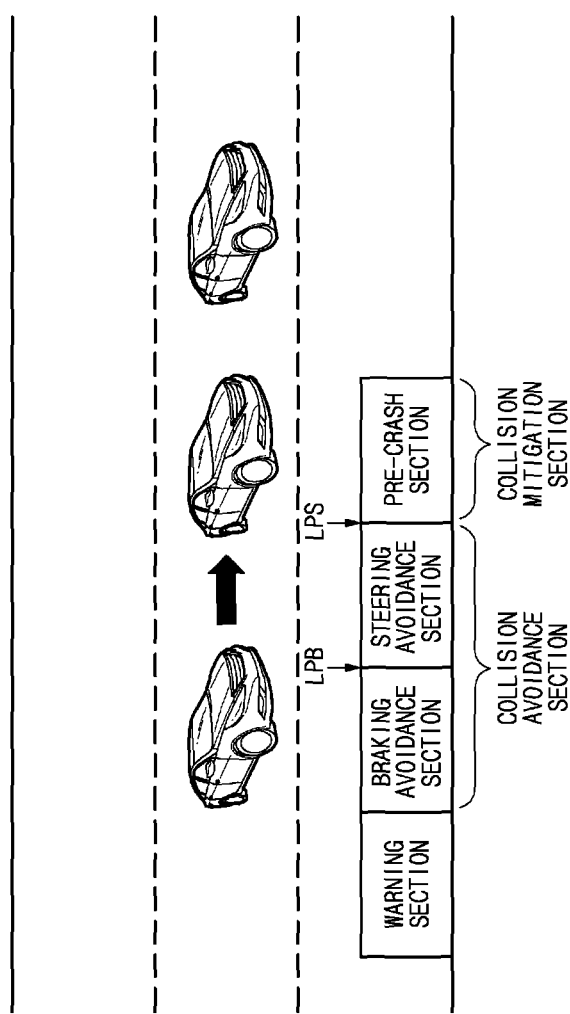
FIG. 2 is an exemplary diagram illustrating a setting of a collision risk area according to an exemplary embodiment of the present invention.

Hereinafter, exemplary embodiments of the present invention will be described below in more detail with reference to the accompanying drawings. FIG. 1 is an exemplary block configuration diagram of an apparatus for preventing a vehicle collision according to an exemplary embodiment of the present invention and FIG. 2 is an exemplary diagram illustrating a setting of a collision risk area according to an exemplary embodiment of the present invention. As illustrated in FIG. 1, the apparatus for preventing a vehicle collision according to the exemplary embodiment of the present invention may include a sensor unit 10, an information collector 20, a last point to brake calculator 30, a last point to steer calculator 40, a collision time calculator 50, a controller 60, and a driving supporter 70. The sensor unit 10, the information collector 20, the last point to brake calculator 30, the last point to steer calculator 40, the collision time calculator 50, and the driving supporter 70 may be executed by the controller 60 which has a memory and a processor.

The sensor unit 10 may include a radar and various sensors, such as an infrared sensor, an image sensor, a gravity sensor, a longitudinal acceleration sensor, a lateral acceleration sensor, a speed sensor, and the like. The sensor unit 10 may be configured to sense a front obstacle and/or a rear-side obstacle of a traveling vehicle or an omni-directional obstacle (e.g., vehicle). Further, the sensor unit 10 may be configured to measure vehicle information regarding an acceleration, a longitudinal acceleration, a lateral acceleration, a speed, a relative speed and a relative distance to a front vehicle, an overlapping quantity with the front vehicle, and the like, using various sensors. In particular, the overlapping quantity with the front vehicle may be a quantity covering the front vehicle based on a width of the traveling vehicle. The information collector 20 may be connected to the sensor unit 10 via a vehicle communication network and may be configured to collect values measured by the sensor unit 10 via the vehicle communication network. The vehicle communication network may be implemented by at least one of a controller area network (CAN), a local interconnect network (LIN), a FlexRay, a media oriented system transport (MOST), and the like.

The last point to brake calculator 30 may be configured to calculate a last point to brake distance collision dLPB and a last point to brake time to collision $t_{LPB}$ based on the vehicle information received from the information collector 20. The last a last point to brake distance (d) to collision and the last point to brake time to collision (LPB TTC) may be presented by the following Equation 1.

$$d_{LPB} = -\frac{v_{rel}^2}{2a_x} \Rightarrow t_{LPB} = \frac{d_{LPB}}{-v_{rel}} = -\frac{v_{rel}}{2\mu g} \qquad \text{Equation 1}$$

In the above Equation 1, $v_{rel}$ represents the relative speed to the front vehicle, $a_x$ represents the longitudinal acceleration, $\mu$ represents a coefficient of friction, and g represents a gravity acceleration of the traveling vehicle. Further, the coefficient of friction may be a constant and may be changed based on a road condition (e.g., pavement material, road surface condition, and the like).

The last point to brake calculator 30 may be configured to calculate a front collision warning time to collision $t_{FCW}$ using the last point to brake time to collision ($t_{LPB}$). The front collision warning time to collision $t_{FCW}$ may be represented by a sum of the last point to brake time to collision and a driver reaction time $\alpha$ based on the following Equation 2.

$$t_{FCW} = t_{LPB} + \alpha$$

The last point to steer calculator 40 may be configured to calculate a last point to steer distance collision $d_{LPS}$ and a last point to steer time to collision $t_{LPS}$ based on the vehicle information received from the information collector 20. The last point to steer distance to collision and the last point to steer time to collision (LPS TTC) may be calculated by the following Equation 3.

$$d_{LPS} = -v_{rel}\sqrt{\frac{2s_y}{a_y}} \Rightarrow t_{LPS} = \frac{d_{LPS}}{-v_{rel}} = \sqrt{\frac{2s_y}{\mu g}} \qquad \text{Equation 3}$$

In the above Equation 3, $v_{rel}$ represents the relative speed to the front vehicle, $a_y$ represents the lateral acceleration of the traveling vehicle, $s_y$ represents the overlapping quantity (e.g., width of traveling vehicle) with the front vehicle, $\mu$ represents the coefficient of friction, and g represents the gravity acceleration of the traveling vehicle.

The collision risk area may be set separately into a warning section, a collision avoidance section, and a collision mitigation section as illustrated in FIG. 2 using the last point to brake distance to collision, the last point to steer distance to collision, and the front collision warning time to collision which may be output from the last point to brake calculator 30 and the last point to steer calculator 40. The warning section may be calculated by adding a margin distance to a front collision warning distance collision which may be calculated based on the front collision warning time to collision.

The collision avoidance section may be divided into a braking avoidance section which may avoid a collision by the braking and a steering avoidance section which may avoid a collision by changing a lane. In particular, the braking avoidance section may be defined as a section from the front collision warning distance to collision to the last point to brake distance to collision and the steering avoidance section may be a section from the last point to brake distance to collision to the last point to steer distance to collision. The collision mitigation section may be a pre-crash section in which a collision may not be avoided by the braking or the lane change. In particular, the pre-crash section may be from the last point to steer distance to collision to a location of the front vehicle.

Moreover, when the relative speed of the traveling vehicle to the front vehicle is reduced to be equal to or less than a threshold value (e.g., about 30 km/h), the locations between the steering avoidance section and the braking avoidance section may be changed to each other. The collision time calculator 50 may be configured to calculate a time to collision (TTC) between the traveling vehicle and the front vehicle using the relative speed and the relative distance to the front vehicle located in front of the traveling vehicle. In other words, the collision time calculator 50 may be configured to obtain the TTC by dividing the relative distance to the front vehicle by the relative speed to the front vehicle.

The controller 60 may be configured to confirm whether the traveling vehicle enters the collision avoidance section based on the TTC output from the collision time calculator 50. In other words, the controller 60 may be configured to confirm whether the TTC is less than the front collision warning time to collision (FCW TTC). Further, when the traveling vehicle enters the collision avoidance section, the controller 60 may be configured to output a warning that inform of a collision possibility between the traveling vehicle and the front vehicle and may be configured to confirm whether a vehicle is present at a rear side of the traveling vehicle.

When the collision risk with the front vehicle is sensed, the controller 60 may be configured to confirm whether the rear-side vehicle is present and which direction (e.g., where/location) the rear-side vehicle is present and confirm whether steering is attempted by the driver. The controller 60 may be configured to execute the driving support based on which direction the rear-side vehicle is present and whether steering is attempted by the driver. When the rear-side vehicle is not present in both (e.g., left/right) directions, the controller 60 may be configured to compare the last point to brake time to collision (LPB TTC) with the last point to steer time to collision (LPS TTC) and execute full braking when the last point to steer time to collision is greater than the last point to brake time to collision but the time to collision (TTC) is less than the last point to brake time to collision. In other words, when the traveling vehicle is beyond the braking avoidance section and thus the braking avoidance may not be performed, the controller 60 may be configured to operate an autonomous emergency brake (AEB) system to execute the full braking. Therefore, the present invention may reduce a damage due to the collision with the front vehicle.

Meanwhile, when the last point to steer time to collision is less than the last point to brake time collision and the time to collision (TTC) is less than the last point to brake time to collision, the controller 60 may be configured to determine that the braking avoidance of the traveling vehicle is not performed. When the traveling vehicle is beyond the braking avoidance section, the controller 60 may be configured to confirm whether steering is attempted by the user (e.g., driver). When the driver performs the steering operation, the controller 60 may be configured to operate an emergency steering assist system to perform the steering based on the steering operation, to support the driving support. When the time to collision (TTC) is less than the last point to steer time to collision, the controller 60 may be configured to determine that the traveling vehicle enters the pre-crash section to operate the AEB system, thereby performing the full braking.

When the rear-side vehicle is present in both directions (e.g., a vehicle is present in both a left and right rearward direction from the traveling vehicle) and when the traveling vehicle enters the collision avoidance section, the controller 60 may be configured to operate the autonomous emergency brake plus (AEB plus, AEB+) system to suppress the steering operation of the driver, thus executing the full braking. Further, the controller 60 may be configured to compare the last point to brake time to collision (LPB TTC) with the last point to steer time to collision (LPS TTC) and execute the full braking when the last point to steer time to collision is equal to greater than the last point to brake time to collision but the time to collision (TTC) is less than the last point to brake time to collision. Meanwhile, when the last point to steer time to collision is less than the last point to brake time to collision and the time to collision (TTC) is less than the last point to brake to collision, the controller 60 may be configured to suppress the steering operation of the driver using the AEB+ system and execute the full braking. Further, when the time to collision (TTC) is less than the last point to steer time to collision, the controller 60 may be configured to execute the full braking.

When the rear-side vehicle is present in one direction (e.g., in a rearward left or right direction of the traveling vehicle), the controller 60 may be configured to confirm whether steering is attempted by the driver when the traveling vehicle enters the collision avoidance section. As the confirmation result, when steering is attempted by the driver, the controller 60 may be configured to confirm whether the rear-side vehicle is present in a steering direction. When the rear-side vehicle is present in the steering direction, the controller 60 may be configured to suppress the steering to execute the full braking. Further, when the rear-side vehicle is not present in the steering direction, the controller 60 may be configured to visually and/or audibly output the warning that the front collision risk is present. The controller 60 may be configured to confirm whether the last point to brake time to collision is equal to or less than the last point to steer time to collision and the traveling vehicle is beyond the braking avoidance section. In particular, when the traveling vehicle is beyond the braking avoidance section, the controller 60 may be configured to execute the full braking.

Further, when the last point to brake time to collision is greater than the last point to steer time to collision, the controller 60 may be configured to confirm whether the braking avoidance of the traveling vehicle may not be performed and when the traveling vehicle may not perform the braking avoidance, confirm whether the driver attempts the steering. In particular, when steering is attempted by the driver (e.g., primary steering), the controller 60 may be configured to confirm whether the rear-side vehicle is present in the steering direction and when the rear-side vehicle is present, the controller 60 may be configured to suppress the steering and execute the full braking. Further, when steering is not attempted by the driver, the controller 60 may be configured to operate an emergency steer assist (ESA) to execute the steering. When the traveling vehicle is beyond the steering avoidance section, the controller 60 may be configured to execute the full braking to mitigate a damage due to the collision with the front vehicle.

The driving supporter 70 may be configured to support the driving of the vehicle based on the operation of the controller

60. In other words, when the controller 60 instructs the emergency steer assist (ESA), the driving supporter 70 may be configured to support a motor driven power steering (MDPS) assist and a lateral assist by partial braking of an electronic stability control (ESC). Further, when the controller 60 instructs the autonomous emergency braking (AEB), the driving supporter 70 may be configured to perform the full braking using the ESC. In addition, when the controller 60 instructs the activation of the autonomous emergency braking plus (AEB+) function, the driving supporter 70 may be configured to suppress the steering and execute the full braking using the ESC.

Figure 3:
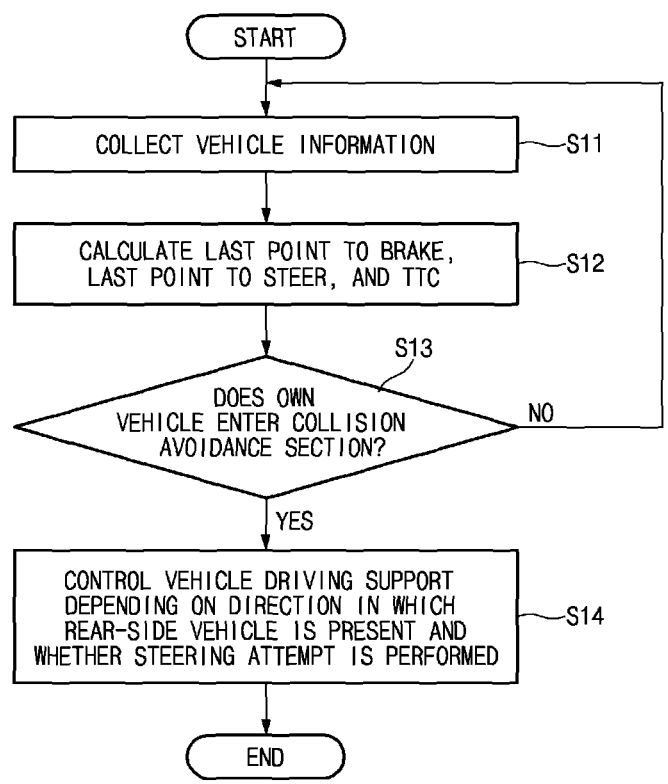
FIG. 3 is an exemplary flow chart illustrating a method for preventing a vehicle collision according to an exemplary embodiment of the present invention.

FIG. 3 is an exemplary flow chart illustrating a method for preventing a vehicle collision according to an exemplary embodiment of the present invention. First, the apparatus for preventing a vehicle collision, the vehicle information measured by the sensor unit 10 which is equipped within the vehicle may be collected through the information collector 20 (S11). In particular, the vehicle information may include the relative speed and the relative distance to the front vehicle and the speed and the acceleration of the traveling vehicle.

The apparatus for preventing a vehicle collision may be configured to calculate the last point to brake distance to collision, the last point to steer distance to collision, the last point to brake time to collision, the last point to steer time to collision, and the time to collision (TTC) using the collected vehicle information (S12). In other words, the last point to brake calculator 30, the last point to steer calculator 40, the collision time calculator 50 may each be configured to calculate the last point to brake distance to collision and the last point to brake time to collision, the last point to steer distance to collision and the last point to steer time to collision, and the time to collision based on the vehicle information output from the information collector 20.

The controller 60 of the apparatus for preventing a vehicle collision may be configured to confirm whether a collision possibility is present between the traveling vehicle and the front vehicle. In particular, the controller 60 may be configured to confirm whether the time to collision (TTC) is less than the front collision warning time to collision (FCW TTC) to determine whether the traveling vehicle enters the collision avoidance section. When the time to collision (TTC) is less than the front collision warning time to collision, the controller 60 may be configured to determine that the traveling vehicle enters the collision avoidance section and when the time to collision (TTC) is equal to or greater than the front collision warning time to collision, the controller 60 may be configured to determine that the traveling vehicle does not enter the collision avoidance section.

When the traveling vehicle enters the collision avoidance section, the controller 60 may be configured to confirm which direction (e.g., where/location) the rear-side vehicle is present and whether steering is attempted by the driver and operate the driving supporter 70 based on which direction the rear-side vehicle is present and whether steering is attempted by the driver to operate the vehicle driving support (S14). In other words, the controller 60 may be configured to confirm which direction the rear-side vehicle is present and whether a lane change is attempted by the driver using the sensor unit 10 and execute the autonomous emergency braking or the emergency steer support or the autonomous emergency braking and the steering suppression.

Figure 4:
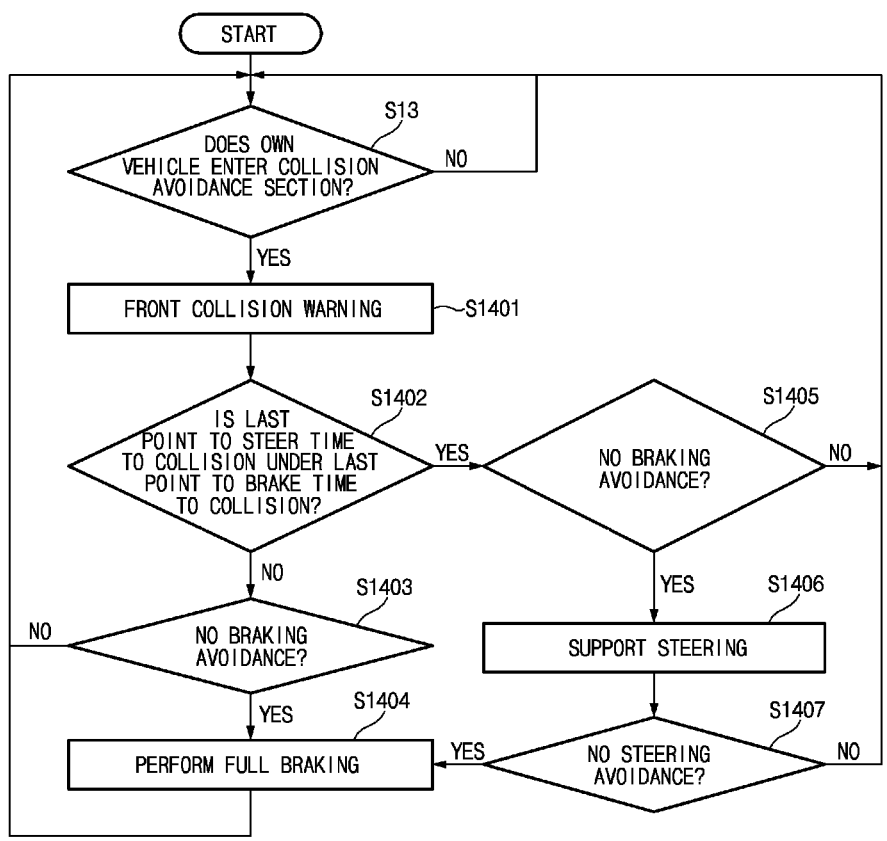
FIG. 4 is an exemplary flow chart illustrating a method of executing a driving support according a first exemplary embodiment of the present invention.

FIG. 4 is an exemplary flow chart illustrating a method of controlling a driving support according to a first exemplary embodiment of the present invention. The exemplary embodiment of the present invention describes, when the rear-side vehicle is not present. First, when the traveling vehicle enters the collision avoidance section (S13), the controller 60 of the apparatus for preventing a vehicle collision may be configured to visually and/or audibly output the warning informing of a collision possibility between the traveling vehicle and the front vehicle (S1401). For example, the controller 60 may be configured to output a warning word and/or a warning sound.

The controller 60 may be configured to confirm whether the last point to steer time to collision (LPS TTC) is less than the last point to brake time to collision (LPB TTC) (S1402). In other words, the controller 60 may be configured to confirm whether the relative speed to the front vehicle is equal to or less than a threshold value. In particular, the threshold value may be the relative speed of the traveling vehicle to the front vehicle when the last point to steer time to collision coincides with the last point to brake time to collision. When the last point to steer time to collision is equal to or greater than the last point to brake time to collision, the controller 60 may be configured to confirm whether the traveling vehicle is beyond the braking avoidance section to determine whether the braking avoidance may not be performed (S1403). When the braking avoidance may not be performed, the controller 60 may be configured to operate the driving supporter 70 to execute the full braking (S1404). Since the traveling vehicle is beyond the braking avoidance section and enters the pre-crash section but the relative speed of the traveling vehicle to the front vehicle is less than the threshold value, the autonomous emergency braking function may be operated by the user to avoid the collision with the front vehicle.

Moreover, in step S1402, when the last point to steer time to collision is less than the last point brake time to collision, the controller 60 may be configured to confirm whether the braking avoidance may not be performed (S1405). In other words, the controller 60 may be configured to confirm whether the time to collision is less than the last point to brake time to collision to confirm whether the traveling vehicle is beyond the braking avoidance section. When the braking avoidance may not be performed, the controller 60 may be configured to confirm whether the driver performs the steering operation to support the steering when the driver performs the steering operation (S1406). Next, the controller 60 may be configured to confirm whether the braking avoidance may not be performed (S1407). In other words, the controller 60 may be configured to confirm whether the traveling vehicle is beyond the steering avoidance section and enters the pre-crash section (e.g., collision mitigation section). When the traveling vehicle may not perform the braking avoidance, the controller 60 may be configured to operate the driving supporter 70 to execute the full braking (S1404). In other words, when the traveling vehicle enters the pre-crash section without the lane change, the controller 60 may be configured to execute the full braking function to mitigate the collision damage with the front vehicle.

Figure 5:
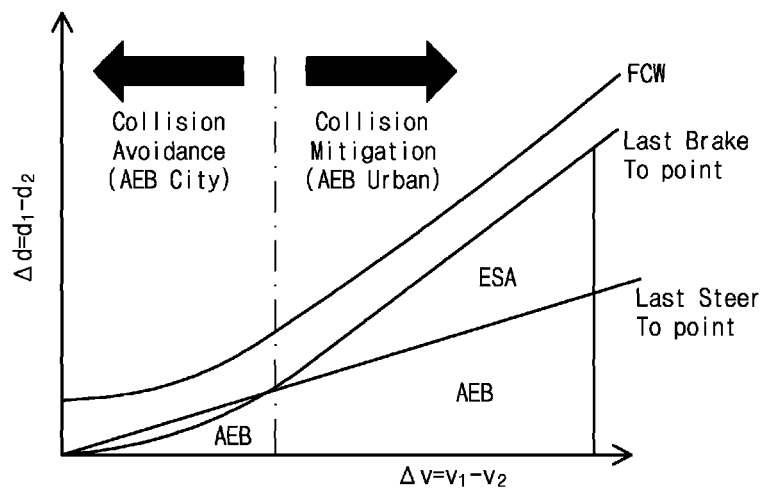
FIG. 5 is an exemplary graph illustrating a last point to brake and a last point to steer based on a relative speed and a relative distance of a traveling vehicle with respect to a front vehicle according to the exemplary embodiment of FIG. 4.

FIG. 5 is an exemplary graph illustrating a last point to brake and a last point to steer based on a relative speed and a relative distance of a traveling vehicle with respect to a front vehicle according to the exemplary embodiment of FIG. 4. As illustrated in FIG. 5, when the relative speed of the traveling vehicle to the front vehicle is less than the threshold value, the last point to brake distance to collision is less than the last point to steer distance to collision, such that the collision may be avoided by the full braking. Meanwhile, when the relative speed of the traveling vehicle to the front vehicle is equal to or greater than the threshold value, the last point to brake distance to collision is greater than the last point steer distance to collision and therefore when the traveling vehicle is beyond the collision avoidance section or enters the pre-crash section, the collision may not avoided but the collision damage with the front vehicle may be mitigated by the full braking. The apparatus for preventing a vehicle collision according to the exemplary embodiment of the present invention may release the full braking function when the steering operation of the driver may be input in the full braking (AEB) area of FIG. 5 and the lane change may be performed based on driver intention.

Figure 6:
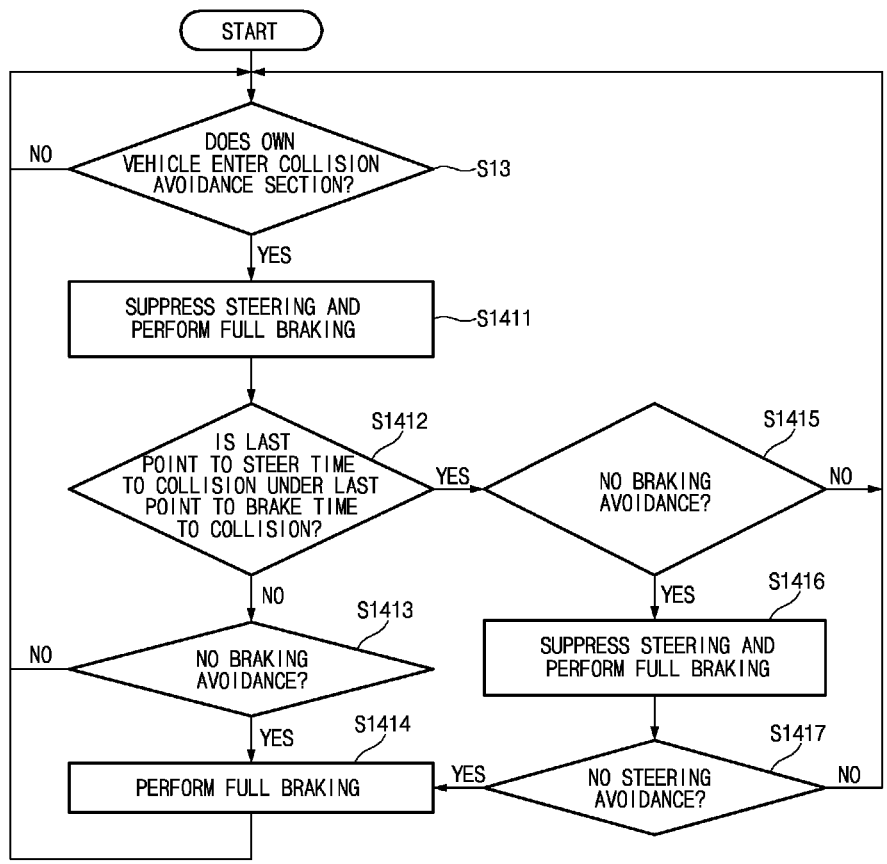
FIG. 6 is an exemplary flow chart illustrating a method of executing a driving support according a second exemplary embodiment of the present invention.

FIG. 6 is an exemplary flow chart illustrating a method of controlling a driving support according to a second exemplary embodiment of the present invention. The exemplary embodiment of the present invention describes, when the rear-side vehicles are present at both sides of the traveling vehicle. Referring to FIG. 6, when the traveling vehicle enters the collision avoidance section (S13), the controller 60 of the apparatus for preventing a vehicle collision may be configured to suppress the steering to prevent the driver from performing the steering operation and execute the full braking (S1411).

The controller 60 may be configured to confirm whether the last point to steer time to collision less than the last point to brake time to collision (S1412). When the last point to steer time to collision greater than the last point to brake time to collision, the controller 60 may be configured to confirm whether the braking avoidance may not be performed (S1413). As the confirmation result, when the braking avoidance may not be performed, the controller 60 may be configured to operate the driving supporter 70 to execute the full braking (S1414). Therefore, the exemplary embodiment of the present invention may avoid the collision between the traveling vehicle and the front vehicle.

Meanwhile, when the last point to steer time to collision is less than the last point to brake time collision, the controller 60 may be configured to confirm whether the braking avoidance may not be performed (S1415). As the confirmation result in step S1415, the controller 60 may be configured to suppress the steering operation and execute the full braking when the braking avoidance may not be performed (S1416). Next, the controller 60 may be configured to confirm whether the traveling vehicle is beyond the steering avoidance section and thus the braking avoidance may not be performed (S1417). When the steering avoidance may not be performed, the controller 60 may be configured to execute the full braking to mitigate the collision avoidance (S1414).

Figure 7:
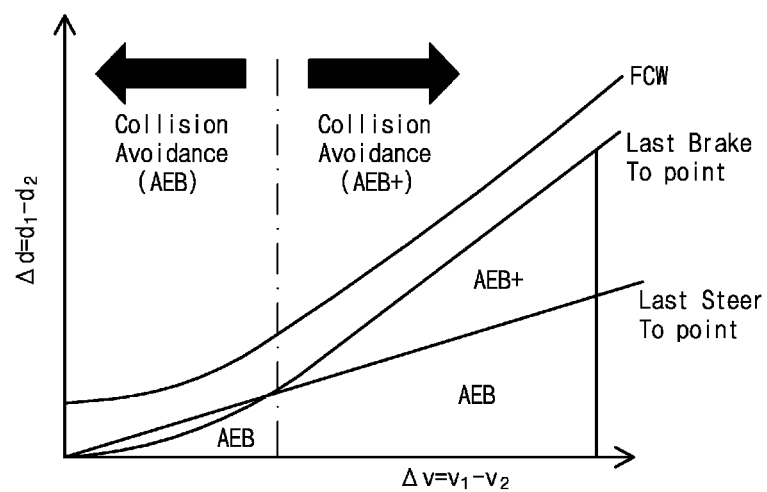
FIG. 7 is an exemplary graph illustrating the last point to brake and the last point to steer based on the relative speed and the relative distance of the traveling vehicle with respect to the front vehicle according to the exemplary embodiment of FIG. 6.

FIG. 7 is an exemplary graph illustrating the last point to brake and the last point to steer based on the relative speed and the relative distance of the traveling vehicle with respect to the front vehicle according to the exemplary embodiment of FIG. 6. As illustrated in FIG. 7, when the rear-side vehicles are present at both sides of the traveling vehicle, the apparatus for preventing a vehicle collision may avoid the collision by the full braking when the last point to brake time to collision is less than the last point to steer time to collision and execute the full braking or the full braking and the steering suppress when the last point to brake time to collision is equal to or greater than the last point to steer time to collision to avoid the collision.

Figure 8:
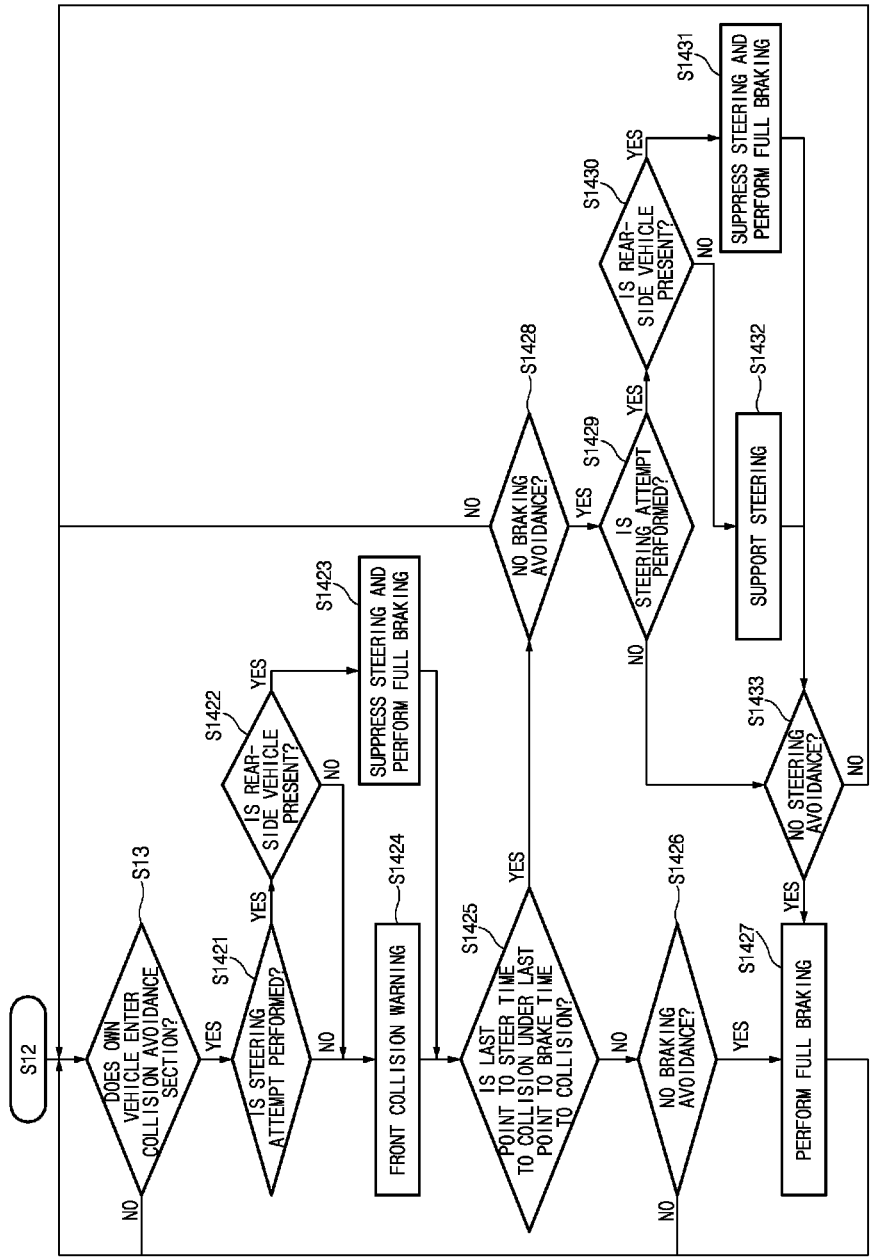
FIG. 8 is an exemplary flow chart illustrating a method of executing a driving support according a third exemplary embodiment of the present invention.

FIG. 8 is an exemplary flow chart illustrating a method of controlling a driving support according to a third exemplary embodiment of the present invention. The exemplary embodiment of the present invention describes, when the rear-side vehicle is present in one direction behind the traveling vehicle. As illustrated in FIG. 8, when the traveling vehicle enters the collision avoidance section (S13), the controller 60 of the apparatus for preventing a vehicle collision may be configured to confirm whether steering is attempted by the driver (S1421). In particular, the controller 60 may be configured to output the warning of a front collision risk when the traveling vehicle enters the collision avoidance section.

When the steering operation of the driver is sensed, the controller 60 may be configured to confirm whether the rear-side vehicle is present in the sensed steering direction (S1422). When the rear-side vehicle is present in the steering direction, the controller 60 may be configured to suppress the primary steering to execute the full braking (S1423). Meanwhile, when the rear-side vehicle is not present in the steering direction, the controller 60 may be configured to output the warning informing of the front collision risk (S1424). The controller 60 may be configured to confirm whether the last point steer time to collision is less than the last point to brake time to collision (S1425). When the last point steer time to collision is greater than the last point to brake time to collision, the controller 60 may be configured to confirm whether the braking avoidance may not be performed (S1426). In other words, the controller 60 may be configured to confirm whether the traveling vehicle is beyond the braking avoidance section. As the confirmation result, when the braking avoidance may not be performed, the controller 60 may be configured to operate the driving supporter 70 to execute the full braking (S1427). Therefore, the exemplary embodiment of the present invention may avoid the collision between the traveling vehicle and the front vehicle.

Meanwhile, in step S1425, when the last point to steer time to collision is less than the last point brake time to collision, the controller 60 may be configured to confirm whether the braking avoidance may not be performed (S1428). The controller 60 may be configured to confirm whether steering is attempted by the driver when the traveling vehicle is beyond the braking avoidance section (S1429) and when steering is attempted by the driver, confirm whether the rear-side vehicle is present in the steering direction (S1430). When the rear-side vehicle is present in the steering direction, the controller 60 may be configured to suppress the secondary steering and execute the full braking (S1431). When the steering is attempted when the traveling vehicle is beyond the braking avoidance section but the rear-side vehicle is present in the steering direction, the controller 60 may be configured to support the emergency steering (S1432). In other words, the controller 60 may be configured to operate the driving supporter 70 to cause the user to attempt the steering (e.g., lane change) in the direction in which the rear-side vehicle is not present, thus avoiding the collision. Meanwhile, the controller 60 may be configured to wait when the driver does not attempt the steering when the traveling vehicle is beyond the braking avoidance section. Next, the controller 60 may be configured to confirm whether the steering avoidance may not be performed (S1433) and when the traveling vehicle is beyond the steering avoidance section and enters the pre-crash section, minimizes the damage due to the collision by the full braking (S1427).

Figure 9A:
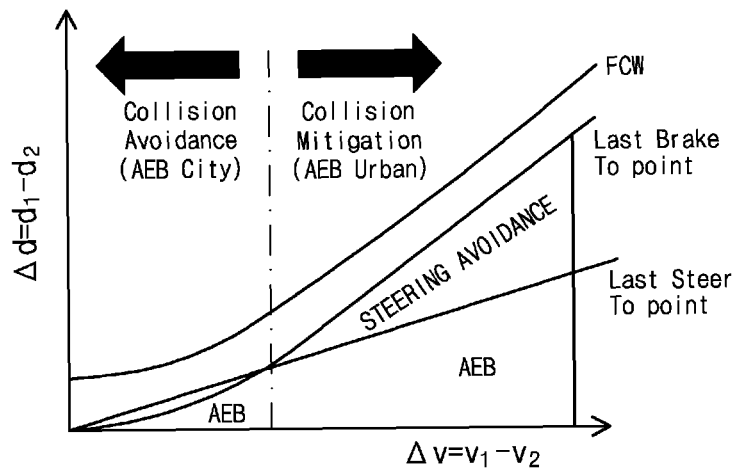
FIGS. 9A-9D are exemplary graphs illustrating a last point to brake and a last point to steer based on a relative speed and a relative distance of a traveling vehicle with respect to a front vehicle according to the exemplary embodiment of FIG. 8.

FIGS. 9A-9D are exemplary graphs illustrating a last point to brake and a last point to steer based on a relative speed and a relative distance of a traveling vehicle with respect to a front vehicle according to the exemplary embodiment of FIG. 8. Referring to FIG. 9A, when the driver does not perform the steering operation, the apparatus for preventing a vehicle collision may be configured to perform the full braking when the traveling vehicle enters the pre-crash section. Further, when the traveling vehicle enters the steering avoidance section, the apparatus for preventing a vehicle collision may be configured to assist the steering in the direction in which the rear-side vehicle is not present, thus avoiding the collision.

Figure 9B:
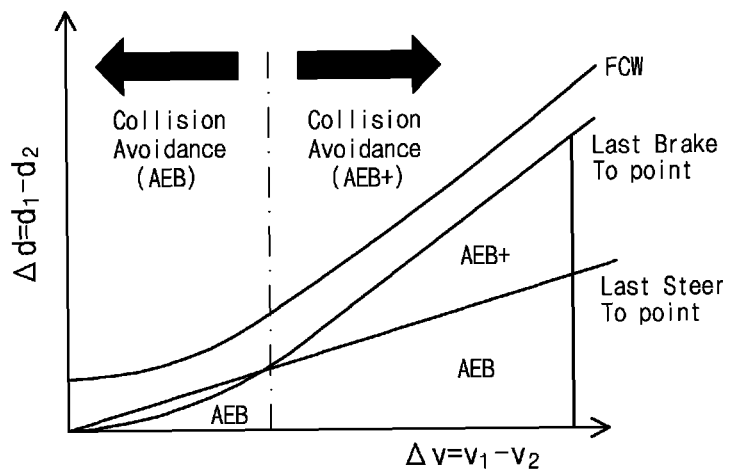
Figure 9C:
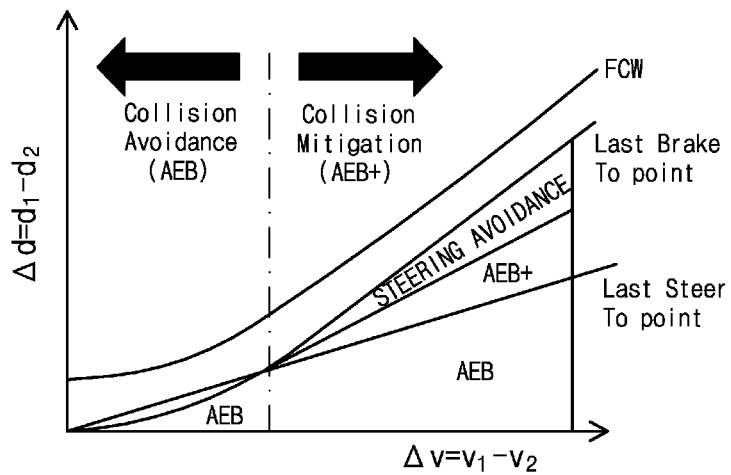
Figure 9D:
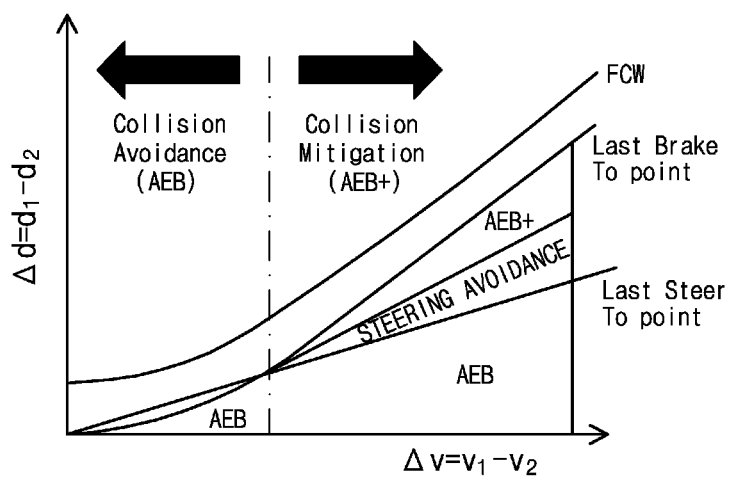

As illustrated in FIG. 9B, when the driver rapidly attempts the steering avoidance, the apparatus for preventing a vehicle collision may be configured to suppress the steering along with the full braking and therefore may avoid the collision both in a substantially low speed area and substantially high speed area (e.g., in any speed limit area). Meanwhile, as illustrated in FIG. 9C, when the driver attempts the steering avoidance (e.g., not rapidly), the collision avoidance may not be performed in the medium and high speed area (e.g., speed limits above a predetermined speed) and the damage due to the collision may be mitigated. As illustrated in FIG. 9D, when the driver rapidly attempts the steering avoidance in the direction in which the rear-side vehicle is present, the full braking may be performed and then the vehicle attempts the lane change in the direction in which the rear-side vehicle is not present.

Figure 10:
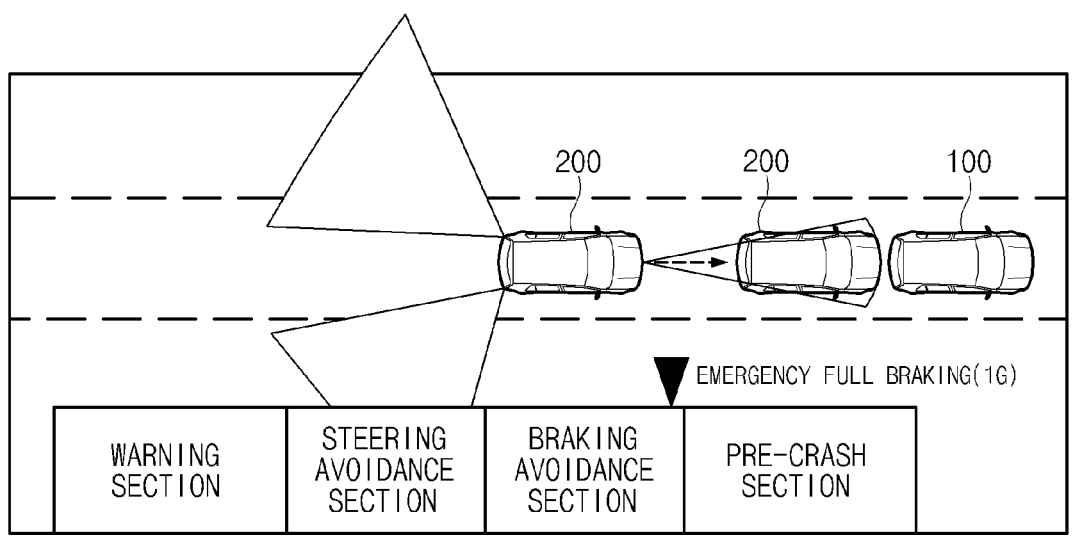
Figure 11:
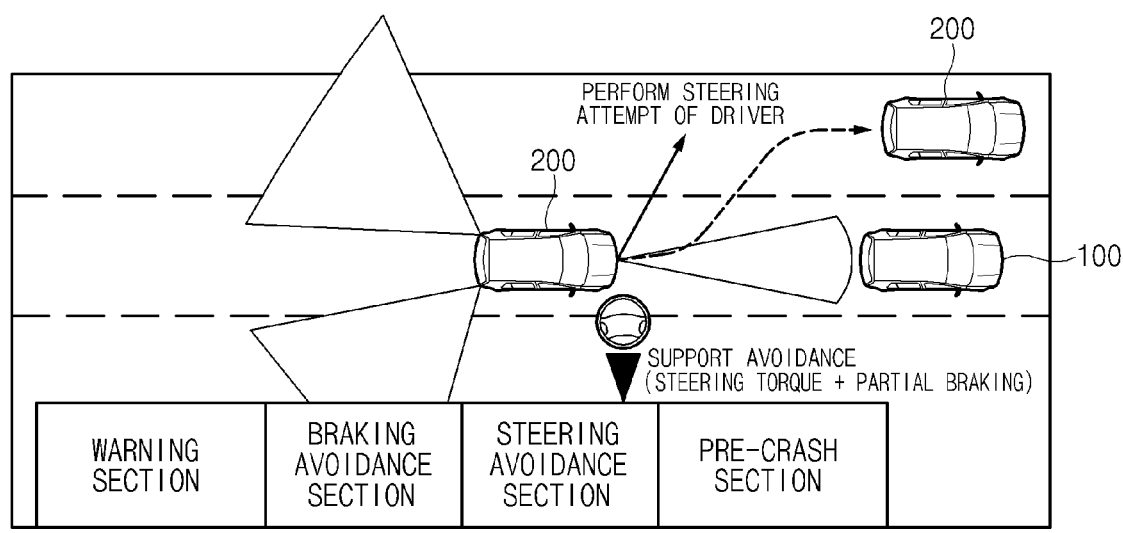

FIGS. 10 to 12 are exemplary diagrams illustrating a collision avoidance method with the front vehicle according to an exemplary embodiment of the present invention.

Referring to FIG. 10, when the traveling vehicle enters the braking avoidance section when the rear-side vehicle is not present and the last point to steer distance to collision is equal to or greater than the last point to brake distance to collision, the apparatus for preventing a vehicle collision may be configured to perform the emergency full braking. In other words, the apparatus for preventing a vehicle collision may be configured to avoid the collision between the traveling vehicle driven at substantially lower speed than the front vehicle and the front vehicle by the full braking.

Referring to FIG. 11, when the traveling vehicle enters the steering avoidance section when the rear-side vehicle is not present and the last point to steer distance to collision is less than the last point to brake distance to collision, the apparatus for preventing a vehicle collision may be configured to confirm whether steering is attempted by the driver. Further, the apparatus for preventing a vehicle collision may be configured to assist the steering torque and the partial braking based on the steering operation of the driver to support the steering avoidance.

As illustrated in FIG. 12, when the driver attempts the lane change in the direction in which the rear-side vehicle is present when the traveling vehicle enters the braking avoidance section, the apparatus for preventing a vehicle collision may be configured to suppress the steering by the driver and execute the full braking. Therefore, the apparatus for preventing a vehicle collision according to the exemplary embodiment of the present invention may avoid the collision between the rear-side vehicle and the front vehicle.

As described above, according to the exemplary embodiments of the present invention, it may be possible to minimize the front and rear-side collision by controlling the vehicle driving based on where the rear-side vehicle is present and whether the driver attempts the steering when the traveling vehicle enters the collision risk area with the front vehicle. As described above, although an apparatus and a method for preventing a vehicle collision according to the present invention were described with reference to the accompanying drawings, the present invention is not limited to the exemplary embodiments described herein and the accompanying drawings and may be modified within the protection range of the scope of the present invention.

What is claimed is:

1. A method for preventing a vehicle collision, comprising:
    collecting, by a controller, vehicle information of a traveling vehicle;
    calculating, by the controller, a last point to brake time to collision, a last point to steer time to collision, a front collision warning time to collision, and time to collision based on the collected vehicle information;
    confirming, by the controller, whether the traveling vehicle enters a collision risk area in which a collision possibility is present between the traveling vehicle and a front vehicle; and
    operating, by the controller, a vehicle driving support based on a direction in which a rear-side vehicle is present, whether steering is attempted, and whether a relative speed of the traveling vehicle to the front vehicle is reduced to be equal to or less than a threshold value when the traveling vehicle enters the collision risk area.

2. The method according to claim 1, wherein in the confirmation of whether the traveling vehicle enters the collision risk area, the method includes determining, by the controller, whether the traveling vehicle enters a collision avoidance section by confirming whether the time to collision is less than the front collision warning time to collision.

3. The method according to claim 1, wherein the operating of the vehicle driving support includes:
    outputting, by the controller, a front collision warning when the traveling vehicle enters collision avoidance section;
    outputting, by the controller, the front collision warning and confirming whether the last point to steer time to collision is less than the last point to brake time to collision;
    confirming, by the controller, whether the traveling vehicle is beyond a braking avoidance section when the last point to steer time to collision is less than the last point to brake time to collision;
    performing, by the controller, a steering support to perform the steering avoidance when the traveling vehicle is beyond the braking avoidance section;
    confirming, by the controller, whether the traveling vehicle is beyond a steering avoidance section; and
    performing, by the controller, full braking when the traveling vehicle is beyond the steering avoidance section.

4. The method according to claim 1, wherein the operating of the vehicle driving support includes:
    suppressing, by the controller, the steering of the traveling vehicle and performing the full braking when the rear-side vehicles are present at both sides of the traveling vehicle when the traveling vehicle enters a collision avoidance section;
    outputting, by the controller, the front collision warning and confirming whether the last point to steer time to collision is less than the last point to brake time to collision;
    confirming, by the controller, whether the traveling vehicle is beyond a braking avoidance section when the last point to steer time to collision is less than the last point to brake time to collision;
    suppressing, by the controller, the steering and executing the full braking when the traveling vehicle is beyond the braking avoidance section;
    confirming, by the controller, whether the traveling vehicle is beyond a steering avoidance section; and
    performing, by the controller, full braking when the traveling vehicle is beyond the steering avoidance section.

5. The method according to claim 1, wherein the operating of the vehicle driving support includes:
    confirming, by the controller, whether a primary steering attempt is performed when the traveling vehicle enters a collision avoidance section;
    confirming, by the controller, whether the rear-side vehicle is present in a primary steering direction when the primary steering attempt is performed;

suppressing, by the controller, the primary steering and performing the full braking when the rear-side vehicle is present in the primary steering direction;

confirming, by the controller, whether the last point to steer time to collision is less than the last point to brake time to collision;

confirming, by the controller, whether the traveling vehicle is beyond the braking avoidance section when the last point to steer time to collision is less than the last point to brake time to collision;

confirming, by the controller, whether a secondary steering attempt is performed when the traveling vehicle is beyond the braking avoidance section;

confirming, by the controller, whether the rear-side vehicle is present in the secondary steering direction when the secondary steering attempt is performed; and suppressing, by the controller, the secondary steering and performing the full braking when the rear-side vehicle is present in the secondary steering direction.

6. The method according to claim 5, further comprising:
maintaining, by the controller, a front collision warning output in response to confirming that the primary steering attempt is not performed in the confirmation of whether the primary steering attempt is performed.

7. The method according to claim 5, further comprising:
performing, by the controller, the steering support to perform the steering avoidance in response to confirming that the secondary steering attempt is performed and the rear-side vehicle is not present in the secondary steering direction in the confirmation of whether the secondary steering attempt is performed.

8. The method according to claim 7, wherein in the performing of the steering support, a motor driven power steering (MDPS) assist and a lateral assist by a partial braking of an electronic stability control (ESC) are provided.

9. The method according to claim 5, further comprising:
confirming, by the controller, whether the traveling vehicle is beyond the braking avoidance section when the last point to steer time to collision is greater than the last point to brake time to collision, as the comparison result; and
performing, by the controller, the full braking when the traveling vehicle is beyond the braking avoidance section.

10. An apparatus for preventing a vehicle collision, comprising:
a sensor unit configured to measure vehicle information using various sensors;
a controller configured to:
collect the vehicle information from the sensor unit;
calculate a last point to brake distance to collision, a last point to brake time to collision, and a front collision warning time to collision based on the vehicle information;
calculate a last point to steer distance to collision and a last point to steer time to collision based on the vehicle information;
calculate time to collision between a traveling vehicle and a front vehicle based on the vehicle information;
sense whether the traveling vehicle enters a collision risk area based on the time to collision, the last point to brake time to collision, the last point to steer time to collision, the front collision warning time to collision and operate a vehicle driving support based on a direction in which a rear-side vehicle is present, a steering operation of a driver, and whether a relative speed of the traveling vehicle to the front vehicle is reduced to be equal to or less than a threshold value within the collision risk area; and
support a vehicle driving.

11. The apparatus according to claim 10, wherein the controller is configured to execute a steering support based on a steering operation when the rear-side vehicle is not present, the last point to steer time to collision is less than the last point to brake time to collision, and a braking avoidance is not performed when the traveling vehicle enters in a collision avoidance section within the collision risk area.

12. The apparatus according to claim 10, wherein the controller is configured to suppress steering and execute full braking when the traveling vehicle enters in a collision avoidance section when the rear-side vehicles are present at both sides of the traveling vehicle and suppress the steering and execute the full braking when the last point to steer time to collision is less than the last point to brake time to collision and the traveling vehicle is beyond a braking avoidance section.

13. The apparatus according to claim 10, wherein the controller is configured to confirm whether a primary steering attempt is performed when the traveling vehicle enters a collision avoidance section and suppress steering and execute the full braking when the rear-side vehicle is present in a primary steering direction.

14. The apparatus according to claim 13, wherein the controller is configured to confirm whether the rear-side vehicle is present in a secondary steering direction when a secondary steering attempt is performed when the last point to steer time to collision is less than the last point to brake time to collision and the braking avoidance is not performed to suppress the steering and execute the full braking when the rear-side vehicle is present.

15. The apparatus according to claim 14, wherein the controller is configured to execute the steering avoidance when the secondary steering attempt is performed in a direction in which the rear-side vehicle is not present.

16. The apparatus according to claim 10, wherein the controller is configured to execute the full braking when the last point to steer time to collision is equal to or greater than the last point to brake time to collision and the braking avoidance is not performed.

17. The apparatus according to claim 10, wherein the controller is configured to perform a motor driven power steering (MDPS) assist and a lateral assist by a partial braking of an electronic stability control (ESC).

18. The apparatus according to claim 10, wherein the controller is configured to perform the full braking using an electronic stability control (ESC).

19. A non-transitory computer readable medium containing program instructions executed by a controller, the computer readable medium comprising:
program instructions that control a sensor unit to measure vehicle information using various sensors;
program instructions that collect the vehicle information from the sensor unit;
program instructions that calculate a last point to brake distance to collision, a last point to brake time to collision, and a front collision warning time to collision based on the vehicle information;
program instructions that calculate a last point to steer distance to collision and a last point to steer time to collision based on the vehicle information;
program instructions that calculate time to collision between a traveling vehicle and a front vehicle based on the vehicle information;

program instructions that sense whether the traveling vehicle enters a collision risk area based on the time to collision, the last point to brake time to collision, the last point to steer time to collision, the front collision warning time to collision and operate a vehicle driving support based on a direction in which a rear-side vehicle is present, a steering operation of a driver, and a relative speed of the traveling vehicle to the front vehicle within the collision risk area; and program instructions that support a vehicle driving.

20. The non-transitory computer readable medium of claim 19, further comprising:

program instructions that execute a steering support based on a steering operation when the rear-side vehicle is not present, the last point to steer time to collision is less than the last point to brake time to collision, and a braking avoidance is not performed when the traveling vehicle enters in a collision avoidance section within the collision risk area.

* * * * *